US012586490B1

(12) United States Patent
Patin

(10) Patent No.: US 12,586,490 B1
(45) Date of Patent: Mar. 24, 2026

(54) DIGITAL PLACARD

(71) Applicant: Randy Patin, Covington, GA (US)

(72) Inventor: Randy Patin, Covington, GA (US)

(*) Notice: Subject to any disclaimer, the term of this patent is extended or adjusted under 35 U.S.C. 154(b) by 0 days.

(21) Appl. No.: 18/752,984

(22) Filed: Jun. 25, 2024

(51) Int. Cl.
*G09F 21/04* (2006.01)
*G09F 9/30* (2006.01)
*G09G 5/00* (2006.01)

(52) U.S. Cl.
CPC .............. *G09F 21/048* (2013.01); *G09F 9/30* (2013.01); *G09G 5/003* (2013.01); *G09G 2354/00* (2013.01); *G09G 2380/10* (2013.01)

(58) Field of Classification Search
None
See application file for complete search history.

(56) References Cited

U.S. PATENT DOCUMENTS 4,715,138 A * 12/1987 Cherico ................ G09F 21/048 40/591
D305,673 S 1/1990 Smith
4,951,045 A * 8/1990 Knapp .................. G08B 5/006 40/550
4,974,354 A * 12/1990 Hembrook, Jr. ..... B60Q 1/5035 362/613
5,008,661 A 4/1991 Raj
D349,360 S 8/1994 Gonsior
6,067,011 A * 5/2000 Leslie .................. B60Q 1/5035 340/471
6,507,284 B1 * 1/2003 Rothney .................. G08B 5/36 340/542
6,865,835 B1 * 3/2005 Webster .................. G09F 21/04 40/591
2006/0066502 A1 * 3/2006 Tseng ........................ G09F 9/30 345/1.1
2017/0140680 A1 * 5/2017 Kucksdorf ............ G09F 13/005
2017/0193883 A1 * 7/2017 Pal .......................... G09F 9/372

FOREIGN PATENT DOCUMENTS

CA 2947889 5/2017

* cited by examiner

*Primary Examiner* — Andre L Matthews

(57) ABSTRACT

The digital placard is a sign for use with an intermodal freight container. The digital placard visibly displays hazard warnings from the intermodal freight container. The digital placard visibly displays a hazard warning image selected from one or more hazard warning images that are consistent with the hazard warning images required by the CMCSA regulations. The digital placard incorporates a frame structure and a display circuit. The display circuit mounts in the frame structure. The display circuit is an electric circuit that displays the hazard warning image selected from the one or more hazard warning images. The frame structure mounts on the intermodal freight container such that the selected hazard warning image is visible from the environment.

7 Claims, 6 Drawing Sheets

DIGITAL PLACARD

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Not Applicable

SUMMARY OF INVENTION

The digital placard is a sign. The digital placard is configured for use with an intermodal freight container. The digital placard visibly displays hazard warnings from the intermodal freight container. The displayed hazard warnings are consistent with the Federal Motor Carrier Safety Administration regulations defined in 49CFR Subpart F Part 172 (hereinafter CMCSA regulations). The digital placard visibly displays a hazard warning image selected from one or more hazard warning images that are consistent with the hazard warning images required by the CMCSA regulations. The digital placard comprises a frame structure and a display circuit. The display circuit mounts in the frame structure. The display circuit is an electric circuit that displays the hazard warning image selected from the one or more hazard warning images. The frame structure mounts on the intermodal freight container such that the selected hazard warning image is visible from the environment.

These together with additional objects, features and advantages of the digital placard will be readily apparent to those of ordinary skill in the art upon reading the following detailed description of the presently preferred, but nonetheless illustrative, embodiments when taken in conjunction with the accompanying drawings.

In this respect, before explaining the current embodiments of the digital placard in detail, it is to be understood that the digital placard is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the digital placard.

It is therefore important that the claims be regarded as including such equivalent construction insofar as they do not depart from the spirit and scope of the digital placard. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
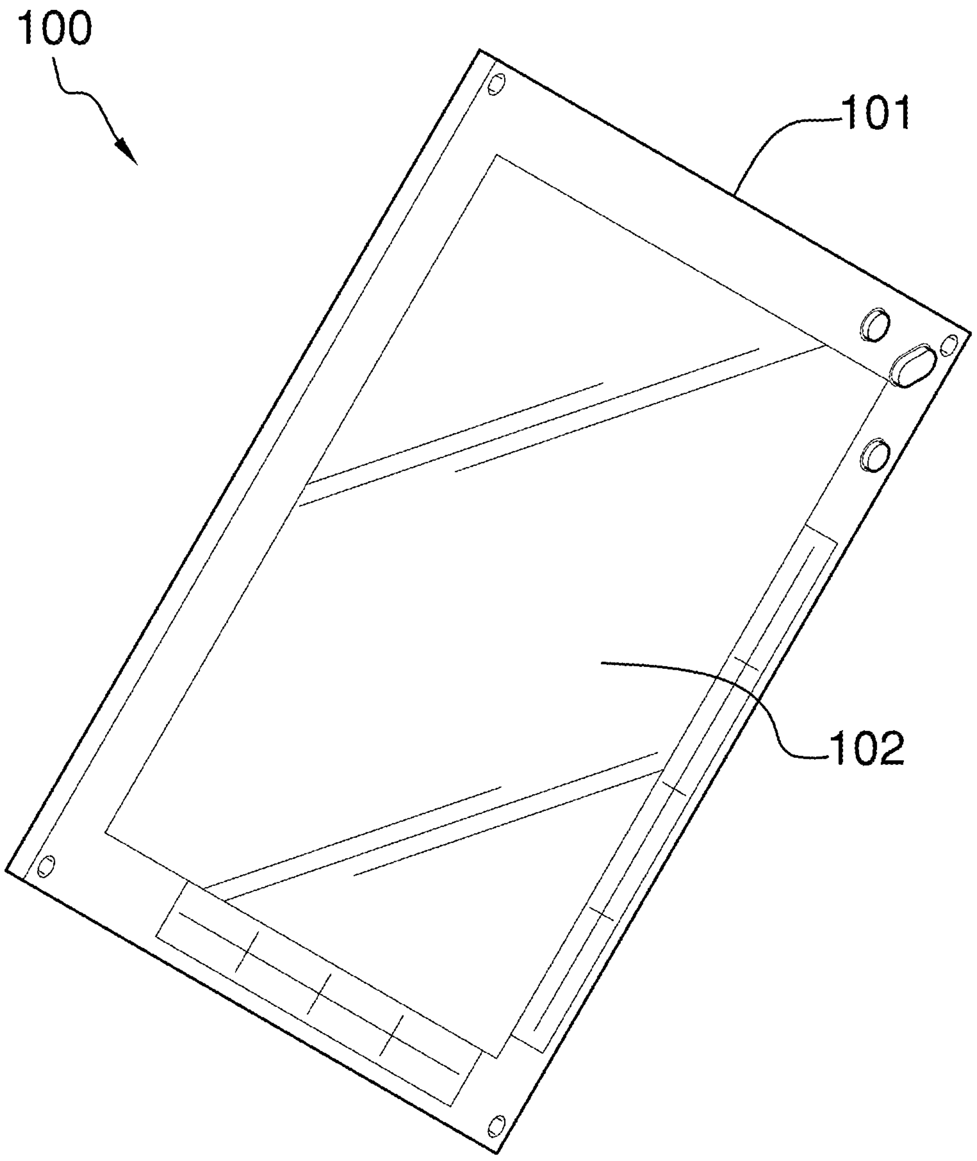
FIG. 1 is a perspective view of an embodiment of the disclosure.
Figure 2:
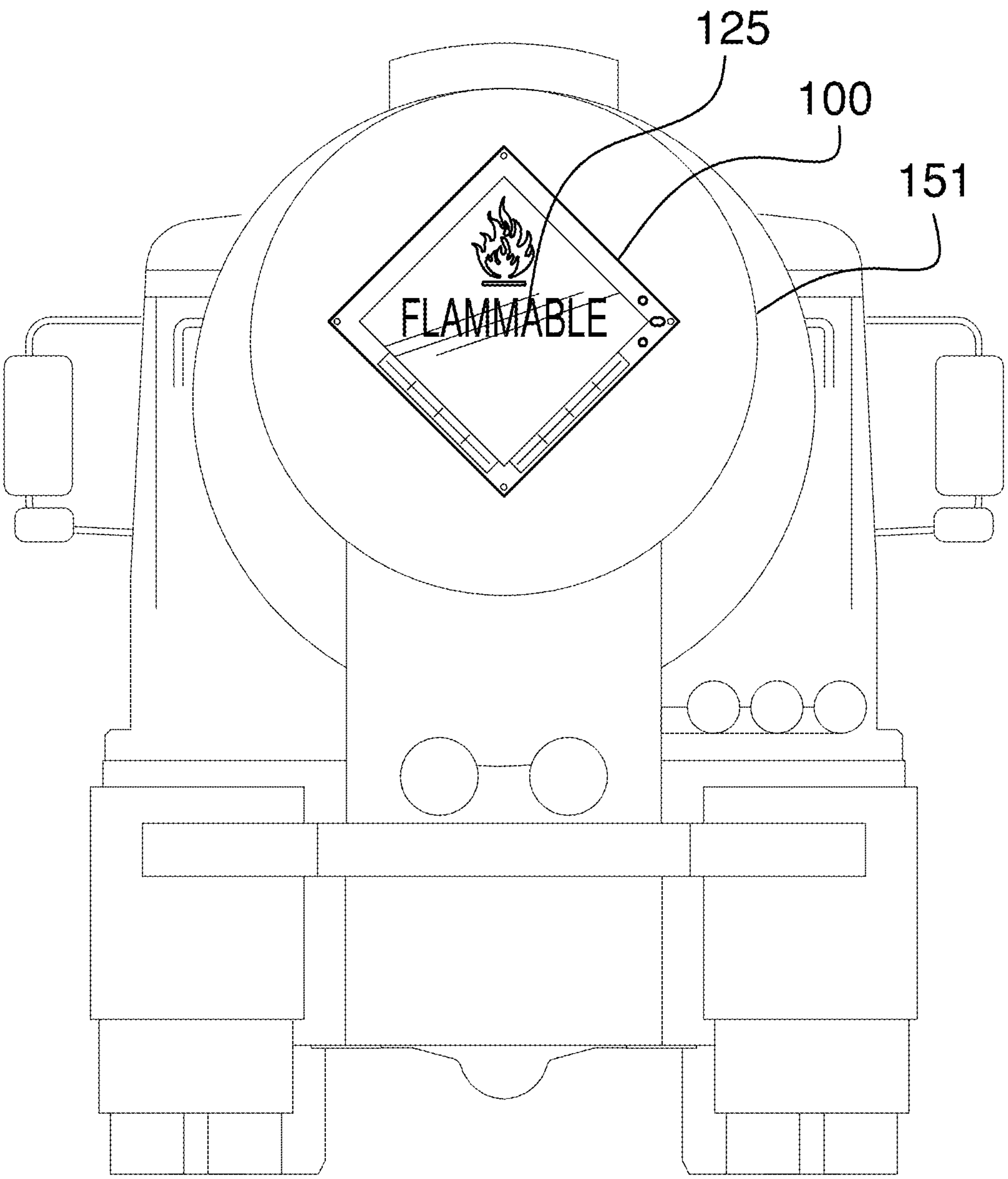
FIG. 2 is an in-use view of an embodiment of the disclosure.
Figure 3:
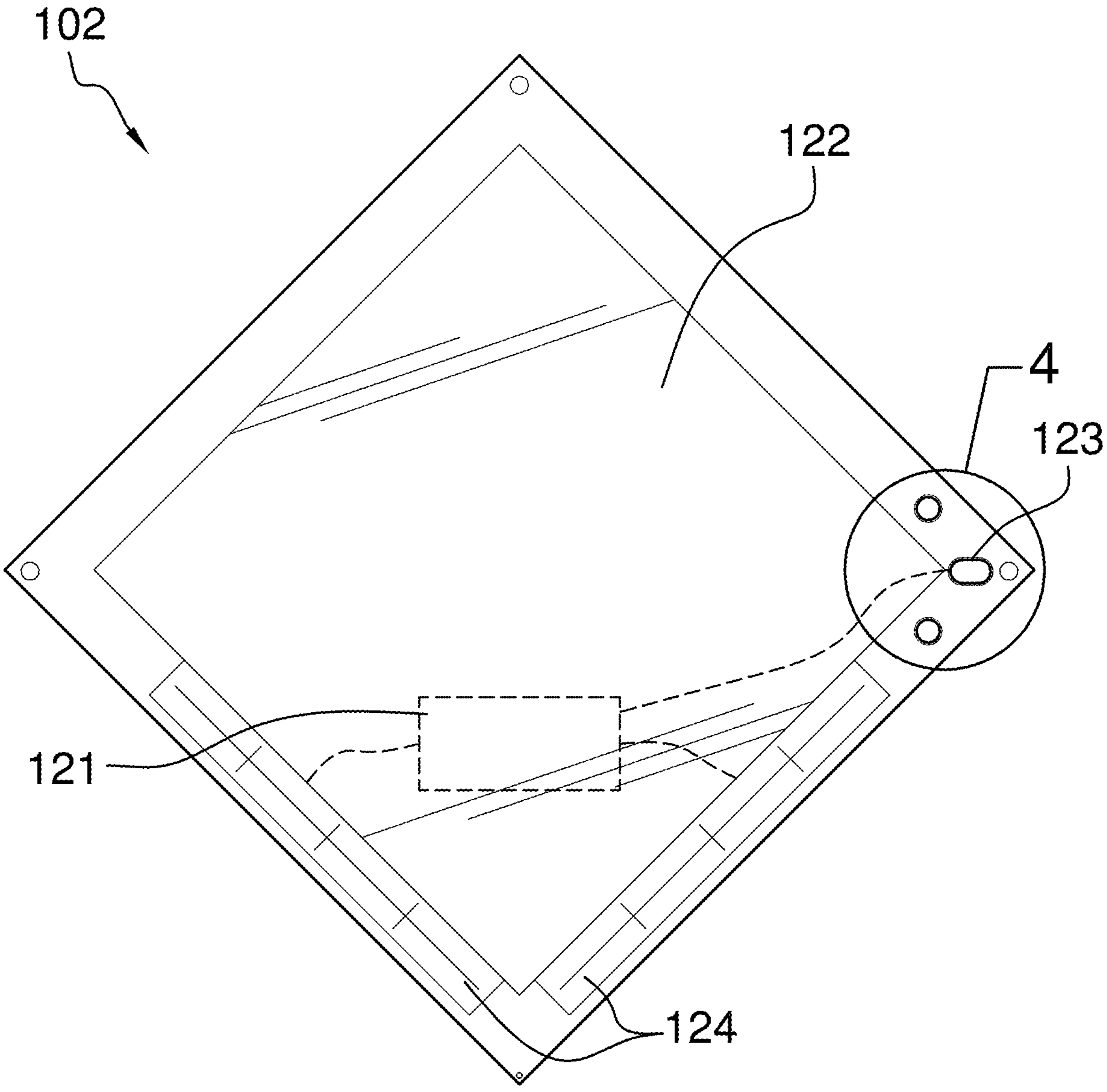
FIG. 3 is a front view of an embodiment of the disclosure.
Figure 4:
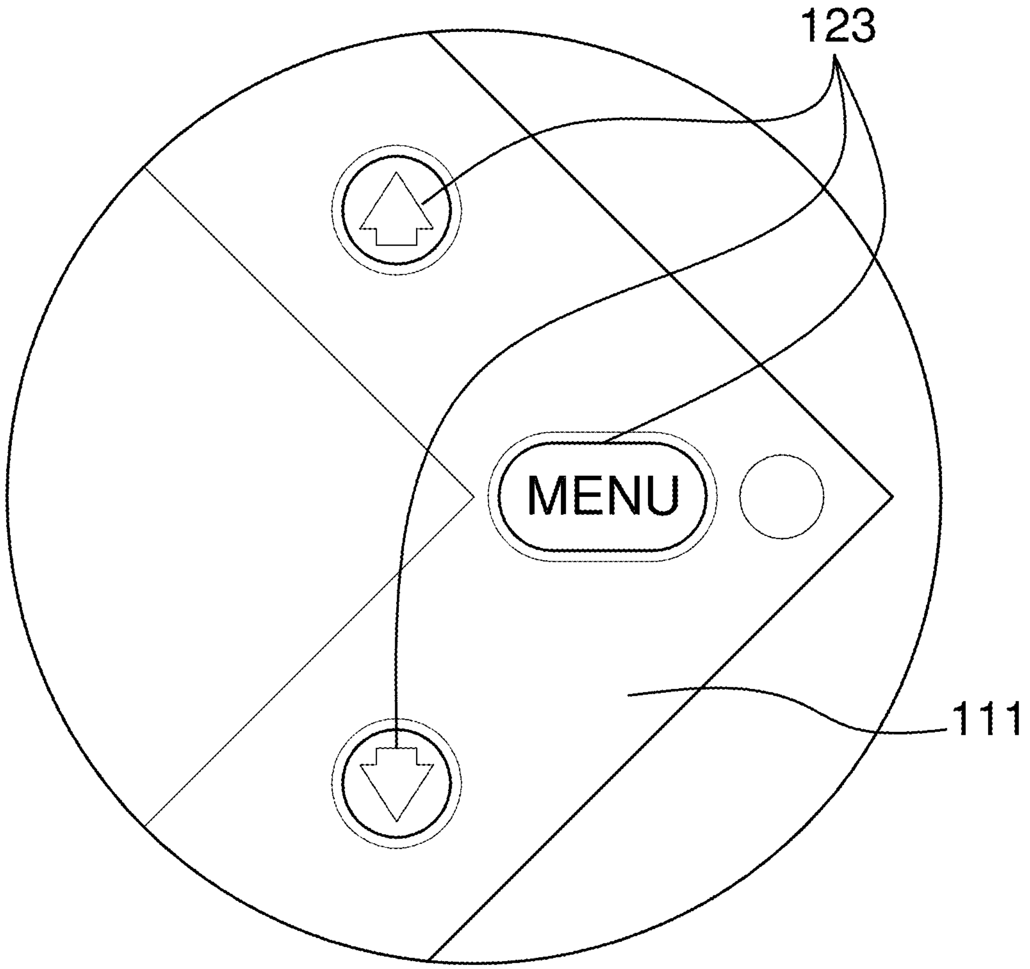
FIG. 4 is a detail view of an embodiment of the disclosure.
Figure 5:
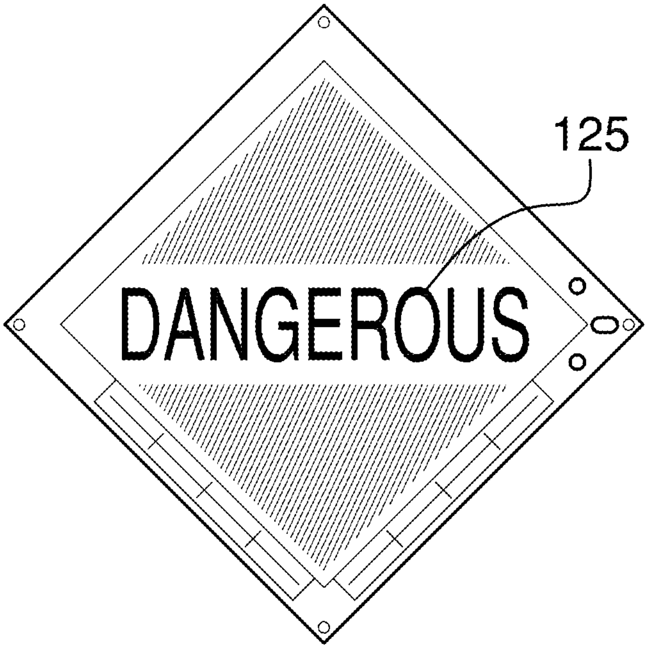
FIG. 5 is an in-use view of an embodiment of the disclosure.
Figure 6:
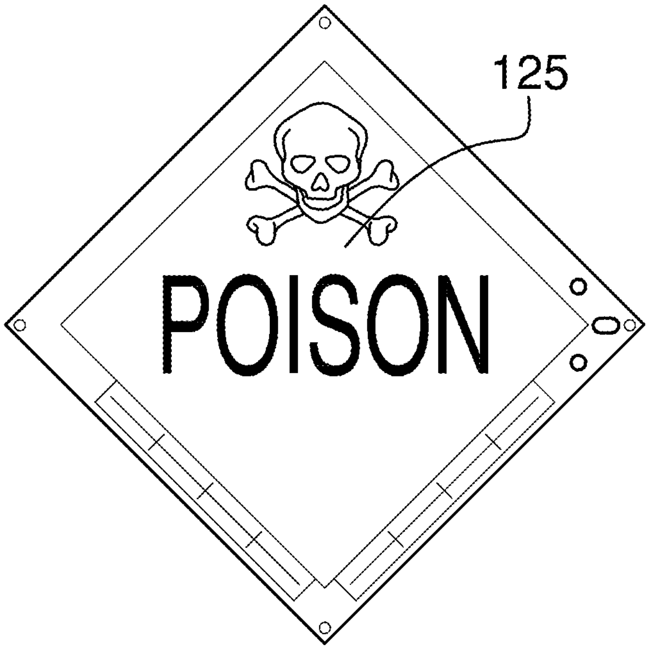
FIG. 6 is an in-use view of an embodiment of the disclosure.

Detailed reference will now be made to one or more potential embodiments of the disclosure, which are illustrated in FIGS. 1 through 6.

The digital placard 100 (hereinafter invention) is a sign. The invention 100 is configured for use with an intermodal freight container 151. The invention 100 visibly displays hazard warning images 125 from the intermodal freight container 151. The displayed hazard warning images 125 are consistent with the Federal Motor Carrier Safety Administration regulations defined in 49CFR Subpart F Part 172 (hereinafter CMCSA regulations). The invention 100 visibly displays a hazard warning image 125 selected from one or more hazard warning images that is consistent with the hazard warning images 125 required by the CMCSA regulations. The invention 100 comprises a frame structure 101 and a display circuit 102. The display circuit 102 mounts in the frame structure 101. The display circuit 102 is an electric circuit that displays the hazard warning image 125 selected from the one or more hazard warning images. The frame structure 101 mounts on the intermodal freight container 151 such that the selected hazard warning image 125 is visible from the environment.

The frame structure 101 is a mechanical structure. The frame structure 101 is a disk shaped structure. The frame structure 101 has a ring structure. The display circuit 102 mounts on the frame structure 101. The frame structure 101 attaches to the intermodal freight container 151 such that the hazard warning image 125 displayed from the display circuit 102 is visible from the environment.

The frame structure 101 further comprises a perimeter structure 111. The perimeter structure 111 forms the physical structure of the frame structure 101. The perimeter structure 111 is a solid structure that surrounds the characteristic aperture of the ring structure of the frame structure 101. The perimeter structure 111 forms the physical structure that secures the display circuit 102 in the characteristic aperture of the frame structure 101. The perimeter structure 111 is a load bearing structure. The perimeter structure 111 is the structure of the frame structure 101 that physically attaches to the exterior surface of the intermodal freight container 151. The perimeter structure 111 transfers the load of the display circuit 102 to the intermodal freight container 151.

The display circuit 102 mounts in the characteristic aperture of the ring structure of the frame structure 101. The display circuit 102 is an electric circuit. The display circuit 102 forms the structure that generates the visible image of the hazard warning image 125. The display circuit 102 mounts in the frame structure 101 such that the generated hazard warning image 125 is visible from the environment. The display circuit 102 stores the video files of one or more hazard warning images 125. The display circuit 102 forms an interface with the environment that allows for the selection of a hazard warning image 125 from the one or more hazard warning images 125. The display circuit 102 visibly displays the selected hazard warning image 125. The display circuit 102 is an independently powered electric circuit. By independently powered is meant that the display circuit 102 can operate without an electrical connection to an external power source.

The display circuit 102 comprises a logic circuit 121, a display device 122, an interface structure 123, and a power circuit 124. The logic circuit 121, the display device 122, the interface structure 123, and the power circuit 124 are electrically interconnected.

The logic circuit 121 is an electric circuit. The logic circuit 121 forms the video source of the display circuit 102. The logic circuit 121 maintains a plurality of video files. Each video file selected from the plurality of video files encodes a hazard warning image 125 selected from the one or more hazard warning images. The logic circuit 121 allows for the selection of any video file encoding a hazard warning image 125 selected from the one or more hazard warning images through the interface structure 123. The logic circuit 121 reencodes the video file of the selected hazard warning image 125 into an electric signal. The logic circuit 121 transmits the reencoded electric signal to the display device 122 for display.

The display device 122 is an electric circuit. The display device 122 forms the structure of the display circuit 102 that visibly displays the selected hazard warning image 125 into the environment. The display device 122 receives the reencoded electric signal from the logic circuit 121. The display device 122 converts the received reencoded electric signal into the hazard warning image 125 that is visibly displayed from the display circuit 102.

The hazard warning image 125 is the image presented by the display device 122. The hazard warning image 125 is formed from indicia that are intended to generate a sentiment when the hazard warning image 125 is viewed from the environment. The sentiment generated by the hazard warning image 125 provides a viewer with information regarding the cargo being transported by the intermodal freight container 151.

The interface structure 123 is a switching structure. The interface structure 123 forms an interface that allows a viewer to scroll through and individually view each hazard warning image 125 selected from the one or more hazard warning images. The interface structure 123 allows for the selection for display of any hazard warning image 125 selected from the one or more hazard warning images. The interface structure 123 allows for the initiation and the discontinuation of the operation of the display circuit 102.

The power circuit 124 is an electrical circuit. The power circuit 124 powers the operation of the display circuit 102. The power circuit 124 is an electrochemical device. The power circuit 124 converts chemical potential energy into the electrical energy required to power the display circuit 102. The power circuit 124 comprises a battery 131, a diode 132, and a photovoltaic cell 133. The battery 131 further comprises a first positive terminal 141. The photovoltaic cell 133 further comprises a second positive terminal 142. The battery 131, the diode 132, and the photovoltaic cell 133 are electrically interconnected.

The battery 131 is a commercially available rechargeable battery 131. The photovoltaic cell 133 is an electrical device that converts light into electrical energy. The chemical energy stored within the rechargeable battery 131 is further renewed and restored through use of the photovoltaic cell 133. The photovoltaic cell 133 is directly wired to the battery 131. The photovoltaic cell 133 is an electrical circuit that reverses the polarity of the rechargeable battery 131 and provides the energy necessary to reverse the chemical processes that the rechargeable battery 131 initially used to generate the electrical energy. This reversal of the chemical process creates a chemical potential energy that will later be used by the rechargeable battery 131 to generate electricity. The diode 132 is an electrical device that allows current to flow in only one direction. The diode 132 installs between the rechargeable battery 131 and the photovoltaic cell 133 such that electricity will not flow from the first positive terminal 141 of the rechargeable battery 131 into the second positive terminal 142 of photovoltaic cell 133. The photovoltaic cell 133 is defined elsewhere in this disclosure.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Barrier: As used in this disclosure, a barrier is a physical obstacle that forms a boundary between a first space and a second space. The barrier prevents the passage of an object between the first space and the second space.

Battery: As used in this disclosure, a battery is a chemical device consisting of one or more cells, in which chemical energy is converted into electricity and used as a source of power. Batteries are commonly defined with a positive terminal and a negative terminal.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Control Circuit: As used in this disclosure, a control circuit is an electrical circuit that manages and regulates the behavior or operation of a device.

Correspond: As used in this disclosure, the term correspond is used as a comparison between two or more objects wherein one or more properties shared by the two or more objects match, agree, or align within acceptable manufacturing tolerances.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

External Power Source: As used in this disclosure, an external power source is a source of the energy that is externally provided to enable the operation of the present disclosure. Examples of external power sources include, but are not limited to, electrical power sources and compressed air sources.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Frame: As used in this disclosure, a frame is a structure or a first sub-structure: a) to which an object or a second sub-structure attaches; and, b) which forms a portion of the load path of the object or the second sub-structure.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Housing: As used in this disclosure, a housing is a rigid structure that encloses and protects one or more devices.

Image: As used in this disclosure, an image is an optical representation or reproduction of an indicia or of the appearance of something or someone.

Indicia: As used in this disclosure, the term indicia refers to a set of markings that identify a sentiment.

Inferior: As used in this disclosure, the term inferior refers to a directional reference that is parallel to and in the same direction as the force of gravity when an object is positioned or used normally.

Interface: As used in this disclosure, an interface is a physical or virtual boundary that separates two different systems and across which information is exchanged.

Interior: As used in this disclosure, the interior is used as a relational term that implies that an object is contained within the boundary of a structure or a space.

Intermodal Freight Container: As used in this disclosure, an intermodal freight container is rigid containment structure that forms a protected space used to store and transport cargo. The intermodal freight container is designed to be transported using a plurality of vehicles and vessels including, but not limited to, water vessels, trains, and tractor trailer vehicles.

Lateral Disk Structure: As used in this disclosure, a lateral disk structure refers to the juxtaposition of a first lateral face of a first disk-shaped structure to a second lateral face of a second disk-shaped structure such that: a) the center axes of the first disk and the second disk are parallel; and, b) the congruent ends of the first disk are parallel to the congruent ends of the second disk. The span of the length of the center axes of the first disk and the second disk need not be equal. The form factor of the congruent ends of the first disk and the second disk need not be geometrically similar.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Logic Circuit: As used in this disclosure, a logic circuit is electrical device that receives one or more digital or analog inputs and uses those digital or analog inputs to generate one or more digital or analog outputs. This disclosure allows, but does not assume, that the logic circuit is a programmable device.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction. In a one to one correspondence, the first element of the first set is said to be associated to the second element of the second set to which the first element corresponds.

Pan: As used in this disclosure, a pan is a hollow containment structure. The pan has a shape selected from the group consisting of: a) a prism; and, b) a truncated pyramid. The pan has a single open face. The open face of the pan is often, but not always, the superior face of the pan. The open face is a surface selected from the group consisting of: a) a congruent end of the prism structure that forms the pan; b) a lateral face of the prism structure that forms the pan, c) the base face of the truncated pyramid structure; and, d) the truncated face of the truncated pyramid structure. A semi-enclosed pan refers to a pan wherein the closed end of prism structure of the pan and/or a portion of the lateral face of the pan is also open.

Perimeter: As used in this disclosure, a perimeter is one or more curved or straight lines that bounds an enclosed area on a plane or surface. The perimeter of a circle is commonly referred to as a circumference.

Photoelectric: As used in this disclosure, photoelectric is an adjective used to describe an electronic component in which the performance of the electronic component is modified by light. Typical photoelectric devices include, but are not limited to, photoelectric transistors, photoelectric diodes, and photoelectric resistors.

Photovoltaic Cell: As used in this disclosure, a photovoltaic cell is a photoelectric device that directly converts light energy into electrical energy.

Pivot: As used in this disclosure, a pivot is a rod or shaft around which an object rotates or swings.

Primary Shape: As used in this disclosure, the primary shape refers to a description of the rough overall geometric shape of an object that is assembled from multiple components or surfaces. The term essential primary shape is used to indicate the exclusion of functional items that are attached to the structure of the primary shape.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; b) maintains conditions that are appropriate for the object; c) protects the object within the protected space from potential dangers that are outside of the protected space; or, d) maintains the privacy of the object within the protected space.

Ring: As used in this disclosure, a ring is a term that is used to describe a disk-like structure through which a negative space is formed through the faces of the disk-like structure.

Rings are often considered loops. The negative space formed through the faces of the disk-like structure is called the characteristic aperture.

Scroll: As used in this disclosure, a scroll refers to the display of a plurality of images in a cyclic manner. By cyclic manner is meant that the plurality of images are displayed in a "cycle" such that each image selected from the plurality of images is displayed once before any image selected from the plurality of images is displayed a second time.

Sentiment: As used in this disclosure, a sentiment refers to a symbolic meaning or message that is communicated through the use of an object or an image, potentially including a text based image.

Sign: As used in this disclosure, a sign is a placard that displays an image, potentially including a text based image, which contains some form of a sentiment.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Video: As used in this disclosure, video refers to the display of: a) an image; or, b) a plurality of images in a manner that simulates the perception of motion for a person viewing the video. This disclosure assumes that a video device can further incorporate sounds associated with the generated images.

Video Device: As used in this disclosure, a video device is a device that generates an image on a display. The image May be a still or moving image.

Video File: As used in this disclosure, a video file is a stored digital representation of an image and the associated audible sounds. Separate hardware is used to convert the digital representation of the sound into an audible sound.

Video Source: As used in this disclosure, a video source is a device that generates electrical signals that can be converted into an image by a display.

Figure 7:
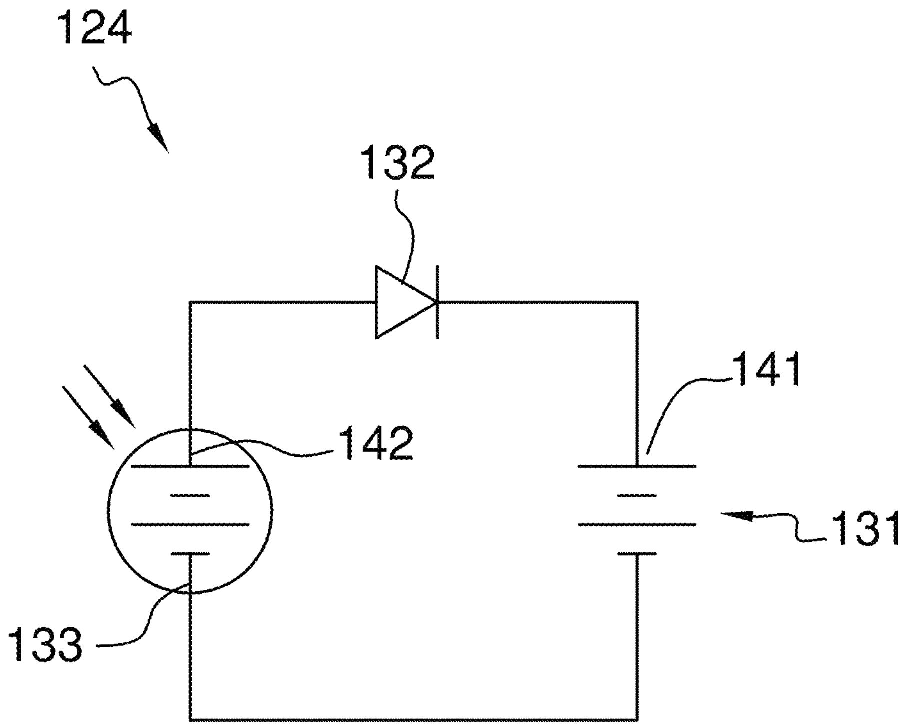
FIG. 7 is a detail view of an embodiment of the disclosure.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A digital placard comprising a frame structure and a display circuit;

wherein the display circuit mounts in the frame structure;

wherein the digital placard is configured to visibly display a hazard warning image selected from one or more hazard warning images from the intermodal freight container;

wherein the display circuit is an electric circuit that displays the hazard warning image selected from the one or more hazard warning images;

wherein the frame structure is configured to attach to the intermodal freight container such that the hazard warning image displayed from the display circuit is visible from the environment;

wherein the display circuit forms an interface with the environment that allows for the selection of a hazard warning image from the one or more hazard warning images;

wherein a control circuit includes an interface structure forms an interface that allows a viewer to scroll through and individually view each hazard warning image selected from the one or more hazard warning images;

wherein the frame structure mounts on the intermodal freight container such that the selected hazard warning image is visible from the environment;

wherein the frame structure is a mechanical structure;

wherein the frame structure has a ring structure;

wherein the display circuit mounts on the frame structure;

wherein the frame structure further comprises a perimeter structure;

wherein the perimeter structure forms the physical structure of the frame structure;

wherein the perimeter structure is a solid structure that surrounds the characteristic aperture of the ring structure of the frame structure;

wherein the perimeter structure forms the physical structure that secures the display circuit in the characteristic aperture of the frame structure;

wherein the perimeter structure is a load bearing structure;

wherein the perimeter structure is the structure of the frame structure that physically attaches to the exterior surface of the intermodal freight container;

wherein the perimeter structure transfers the load of the display circuit to the intermodal freight container;

wherein the display circuit mounts in the characteristic aperture of the ring structure of the frame structure;

wherein the display circuit is an electric circuit;

wherein the display circuit forms the structure that generates the visible image of the hazard warning image;

wherein the display circuit mounts in the frame structure such that the generated hazard warning image is visible from the environment;

wherein the display circuit stores the one or more hazard warning images;

wherein the display circuit is an independently powered electric circuit;

wherein by independently powered is meant that the display circuit can operate without an electrical connection to an external power source;

wherein the display circuit comprises a logic circuit, a display device, the interface structure, and a power circuit;

wherein the logic circuit, the display device, the interface structure, and the power circuit are electrically interconnected.

2. The digital placard according to claim 1
wherein the logic circuit is an electric circuit;
wherein the logic circuit forms the video source of the display circuit;
wherein each video file selected from the plurality of video files encodes a hazard warning image selected from the one or more hazard warning images;
wherein the logic circuit allows for the selection of hazard warning image selected from the one or more hazard warning images;
wherein the logic circuit reencodes the selected hazard warning image into an electric signal;
wherein the logic circuit transmits the reencoded electric signal to the display device for display.

3. The digital placard according to claim 2
wherein the display device is an electric circuit;
wherein the display device forms the structure of the display circuit that visibly displays the selected hazard warning image into the environment;
wherein the display device receives the reencoded electric signal from the logic circuit;
wherein the display device converts the received reencoded electric signal into the hazard warning image that is visibly displayed from the display circuit.

4. The digital placard according to claim 3
wherein the interface structure is a switching structure;
wherein the interface structure allows for the selection for display of any hazard warning image selected from the one or more hazard warning images;
wherein the interface structure allows for the initiation and the discontinuation of the operation of the display circuit.

5. The digital placard according to claim 4
wherein the power circuit is an electrical circuit;
wherein the power circuit powers the operation of the display circuit;
wherein the power circuit is an electrochemical device.

6. The digital placard according to claim 5
wherein the power circuit comprises a battery, a diode, and a photovoltaic cell;
wherein the battery further comprises a first positive terminal;
wherein the photovoltaic cell further comprises a second positive terminal;
wherein the battery, the diode, and the photovoltaic cell are electrically interconnected.

7. The digital placard according to claim 6
wherein the battery is a rechargeable battery;
wherein the photovoltaic cell is an electrical device that converts light into electrical energy;
wherein the photovoltaic cell is an electrical circuit that reverses the polarity of the rechargeable battery and provides the energy necessary to reverse the chemical processes that the rechargeable battery initially used to generate the electrical energy;
wherein the diode is an electrical device that allows current to flow in only one direction;
wherein the diode installs between the rechargeable battery and the photovoltaic cell such that electricity will not flow from the first positive terminal of the rechargeable battery into the second positive terminal of photovoltaic cell.

* * * * *